United States Patent
Pothireddy et al.

(10) Patent No.: US 7,853,738 B2
(45) Date of Patent: Dec. 14, 2010

(54) EFFICIENT LOAD/STORE BUFFER MEMORY MANAGEMENT IN A COMPUTER COMMUNICATIONS NETWORK DATA TRANSMISSION SWITCH

(75) Inventors: Anil Pothireddy, Hyderabad (IN); Jayashri Arsikere Basappa, Karnataka (IN); Gopikrishnan Viswanadhan, Karnataka (IN); Neranjen Ramalingam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 12/191,364

(22) Filed: Aug. 14, 2008

(65) Prior Publication Data

US 2010/0042762 A1 Feb. 18, 2010

(51) Int. Cl.
*G06F 3/00* (2006.01)
*G06F 12/00* (2006.01)
(52) U.S. Cl. .......................... 710/52; 710/56; 711/153
(58) Field of Classification Search ................... 710/52, 710/56; 711/153
See application file for complete search history.

(56) References Cited

U.S. PATENT DOCUMENTS

| | | | |
|---|---|---|---|
| 5,588,138 A | | 12/1996 | Bai et al. |
| 6,046,817 A | * | 4/2000 | Brown et al. ............... 358/1.16 |
| 6,108,306 A | * | 8/2000 | Kalkunte et al. ............ 370/235 |
| 6,456,590 B1 | | 9/2002 | Ren et al. |
| 6,690,951 B1 | * | 2/2004 | Cuffaro et al. .............. 455/560 |
| 6,788,697 B1 | * | 9/2004 | Aweya et al. ............... 370/412 |
| 7,007,150 B2 | * | 2/2006 | Valentin et al. ............. 711/170 |
| 2002/0120797 A1 | * | 8/2002 | Fabre ......................... 710/60 |

* cited by examiner

*Primary Examiner*—Alford W Kindred
*Assistant Examiner*—David E Martinez
(74) *Attorney, Agent, or Firm*—Stanley Ference; Grant A. Johnson

(57) ABSTRACT

A technique is disclosed for observing the data movement pattern in a peripheral device attached to a computer communications network data transmission switch, in order to arrive at a (statistical) determination of whether the peripheral device is being used as a "load intensive" device or as a "store intensive" device (or as neither type) over a defined time period. This determination is used to dynamically adjust (and re-allocate) the "outbound" and "inbound" buffer memory sizes assigned to a switch transmission port attached to the peripheral device, in cases where the device is operating in either "load intensive" or "store intensive" mode. The invention is applicable for use with all types of communications network switches (i.e. "Bridges", "Hubs", "Routers" etc.).

14 Claims, 3 Drawing Sheets

EFFICIENT LOAD/STORE BUFFER MEMORY MANAGEMENT IN A COMPUTER COMMUNICATIONS NETWORK DATA TRANSMISSION SWITCH

FIELD OF THE INVENTION

The present invention relates generally to buffer memory management in use of computer communications network data transmission switches.

BACKGROUND OF THE INVENTION

The data transmission switches (i.e. Bridges, Hubs, Routers etc.) used in computer network (including Internet such as for example TCP/IP) serial communication protocols have a dedicated amount of memory allocated per transmission (input/output) port (also called "buffer memory"). This buffer memory is used by the switch for "loading transactions" (i.e. where the data transfer direction is inbound from an attached peripheral device to the switch) and for "storage transactions" (i.e. where the data transfer direction is outbound from the switch to an attached peripheral device).

Given the wide variety of peripheral devices in use today, it is possible for some of them to function as "store intensive" devices (i.e., the amount of data received by the device is much larger than the amount of data it transmits) while others can function as "load intensive" devices (i.e., the amount of data transmitted by the device is much larger than the amount of data it receives). Some examples of "store intensive" peripheral devices include printers, LCD monitors, etc.; while some examples of "load intensive" peripheral devices are: scanners, PC cameras, DVD/CD ROMs, etc.

Those switches supporting the "Hot-Plug" and "Hot-Swap" communication protocol(s) are designed to be connected to any ("generic") peripheral device that is compatible with the protocol that the switch supports. The switches used for "generic" peripheral devices typically do not offer any optimization solutions for utilizing the buffer memory allocated to a "load" intensive" or "store intensive" device, often causing a large portion of the memory allocated for the less frequent transmission direction of a device port to be left unused (and thus creating a need to make switch buffer memory utilization more efficient in order to improve overall system or network performance).

SUMMARY OF THE INVENTION

In accordance with at least one presently preferred embodiment of the invention, there is broadly contemplated herein a technique for observing the data movement pattern in a peripheral device attached to a computer communications network data transmission switch, in order to arrive at a (statistical) determination of whether the peripheral device is being used as a "load intensive" device or as a "store intensive" device (or as neither type) over a defined time period. This determination is used to dynamically adjust (and re-allocate) the "outbound" and "inbound" buffer memory sizes assigned to a switch transmission port attached to the peripheral device, in cases where the device is operating in either "load intensive" or "store intensive" mode. The invention is applicable for use with all types of communications network switches (i.e. "Bridges", "Hubs", "Routers" etc.).

The invention provides a way to dynamically re-allocate switch buffer memory between "outbound" and "inbound" data transactions by adding two counters per switch transmission port to count the number of "outbound" and "inbound" data transmissions respectively occurring at that port over a defined period of time. Both counters are reset when a peripheral device is connected to the switch at that port and the "outbound" and "inbound" data transactions are (re)counted until the count for one transaction type reaches a peak value; whereupon use of the attached device is evaluated to determine whether it is a "load intensive" device or a "store intensive" device (or neither type at that time) based on the ratio of the values of the two counters at the time when one of them reaches its peak.

In summary, one aspect of the invention provides a method of buffer memory management in use of a computer communications network data transmission switch, the method comprising the steps of: a. monitoring the data movement pattern(s) in a peripheral device attached to a switch; b. determining whether the peripheral device is used in a load intensive mode or in a store intensive mode or in neither mode over a defined time period; and c. adjusting the size of at least one switch memory buffer assigned to the peripheral device; wherein the assigned switch buffer memory is dynamically reallocated when the peripheral device is operating in load intensive mode or in store intensive mode.

Another aspect of the invention provides a computer system comprised of a computer processor configured for executing program instructions stored in computer memory and arranged for buffer memory management in use of a computer communications network data transmission switch, the system comprising: a. an arrangement for monitoring the data movement pattern(s) in a peripheral device attached to a switch; b. an arrangement for determining whether the peripheral device is used in a load intensive mode or in a store intensive mode or in neither mode over a defined time period; and c. an arrangement for adjusting the size of at least one switch memory buffer assigned to the peripheral device; wherein the assigned switch buffer memory is dynamically reallocated when the peripheral device is operating in load intensive mode or in store intensive mode.

Furthermore, an additional aspect of the invention provides a computer program storage device readable by a computer processor machine, tangibly embodying a program of instructions executable by the machine to perform a method of buffer memory management in use of a computer communications network data transmission switch, the method comprising the steps of: a. monitoring the data movement pattern(s) in a peripheral device attached to a switch; b. determining whether the peripheral device is used in a load intensive mode or in a store intensive mode or in neither mode over a defined time period; and c. adjusting the size of at least one switch memory buffer assigned to the peripheral device; wherein the assigned switch buffer memory is dynamically reallocated when the peripheral device is operating in load intensive mode or in store intensive mode.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
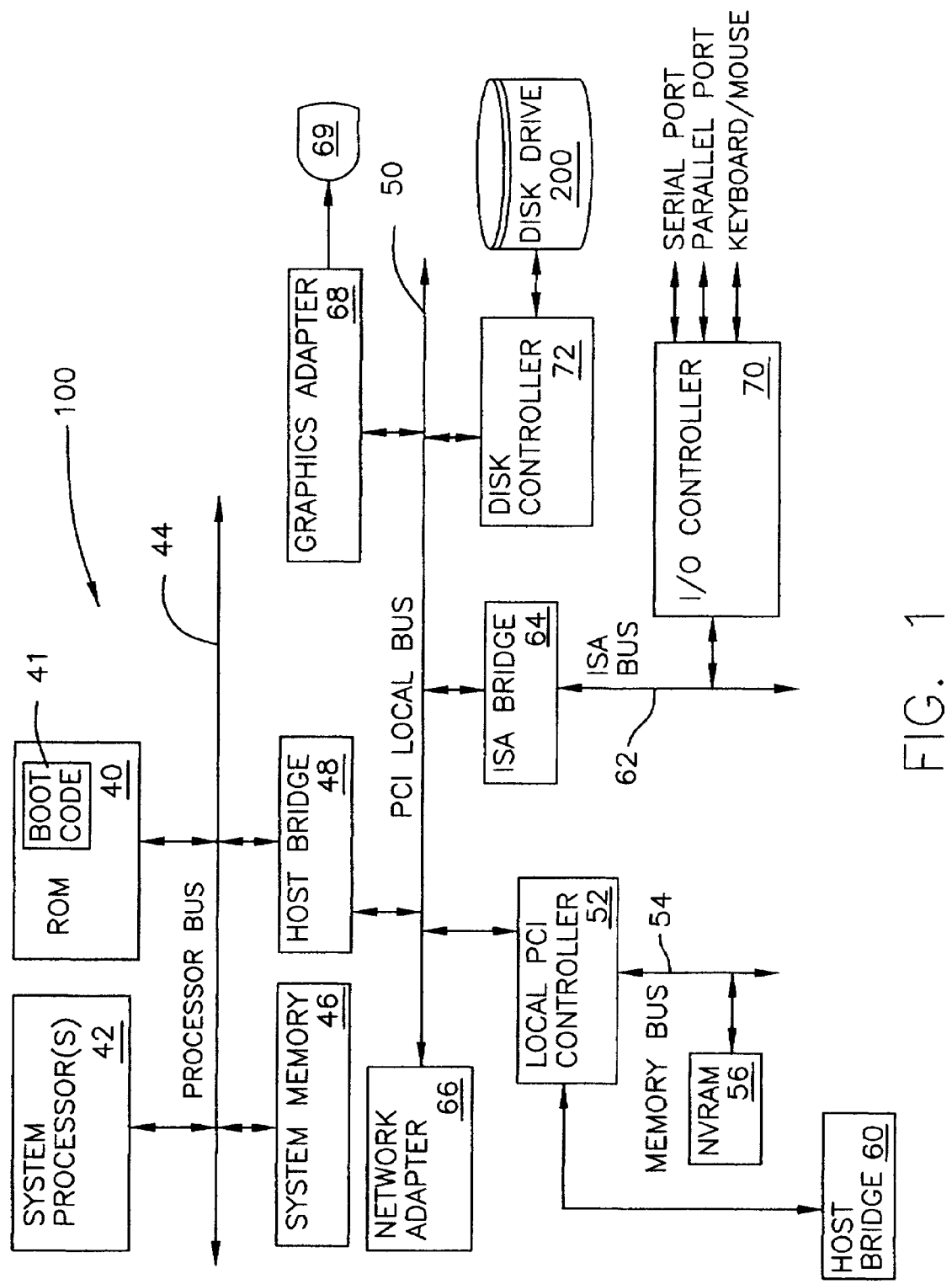
FIG. 1 schematically illustrates a computer system with which a preferred embodiment of the present invention can be used.
Figure 2:
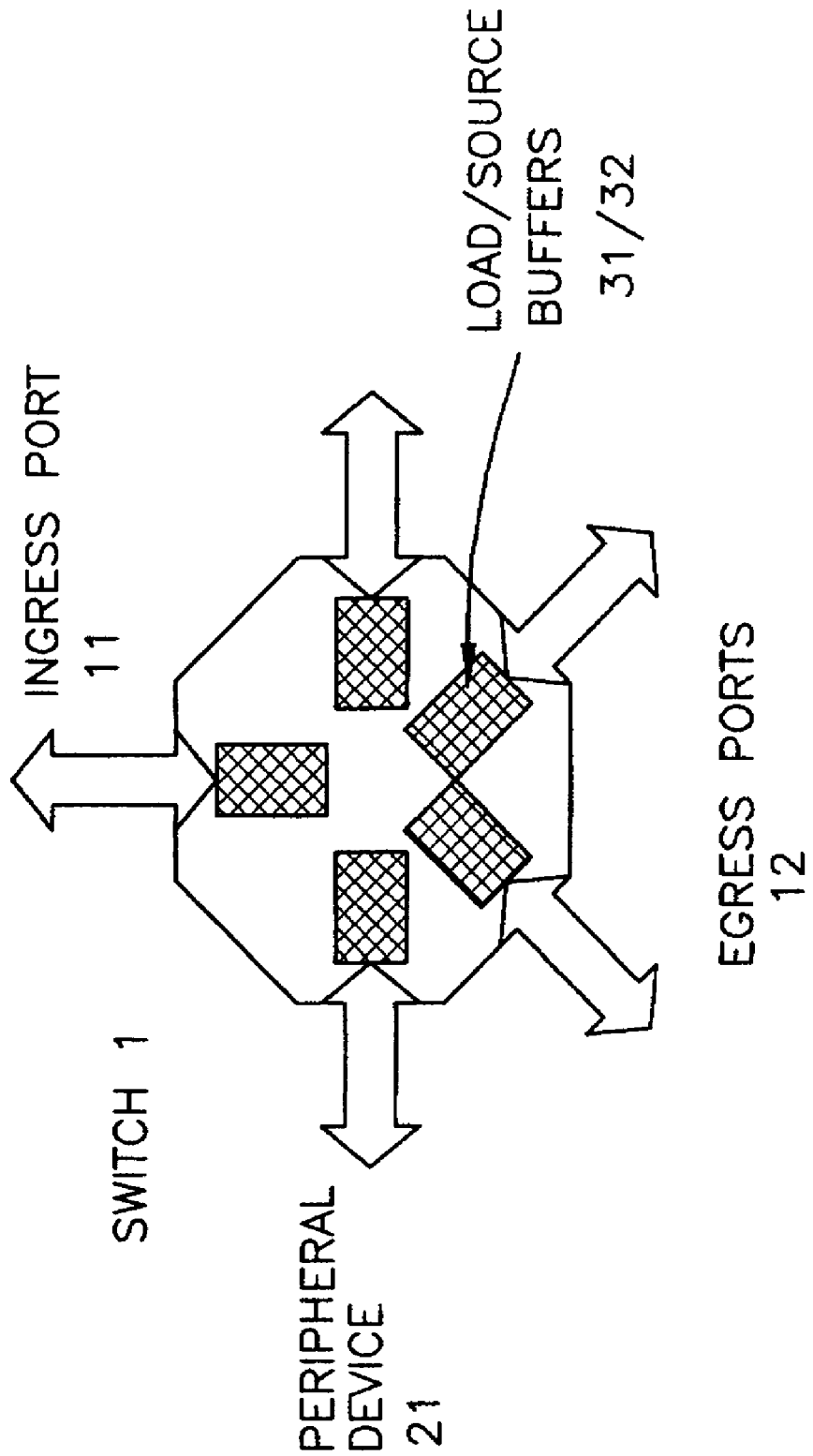
FIG. 2 illustrates a computer communications network data transmission switch with which a preferred embodiment of the present invention can be used.
Figure 3:
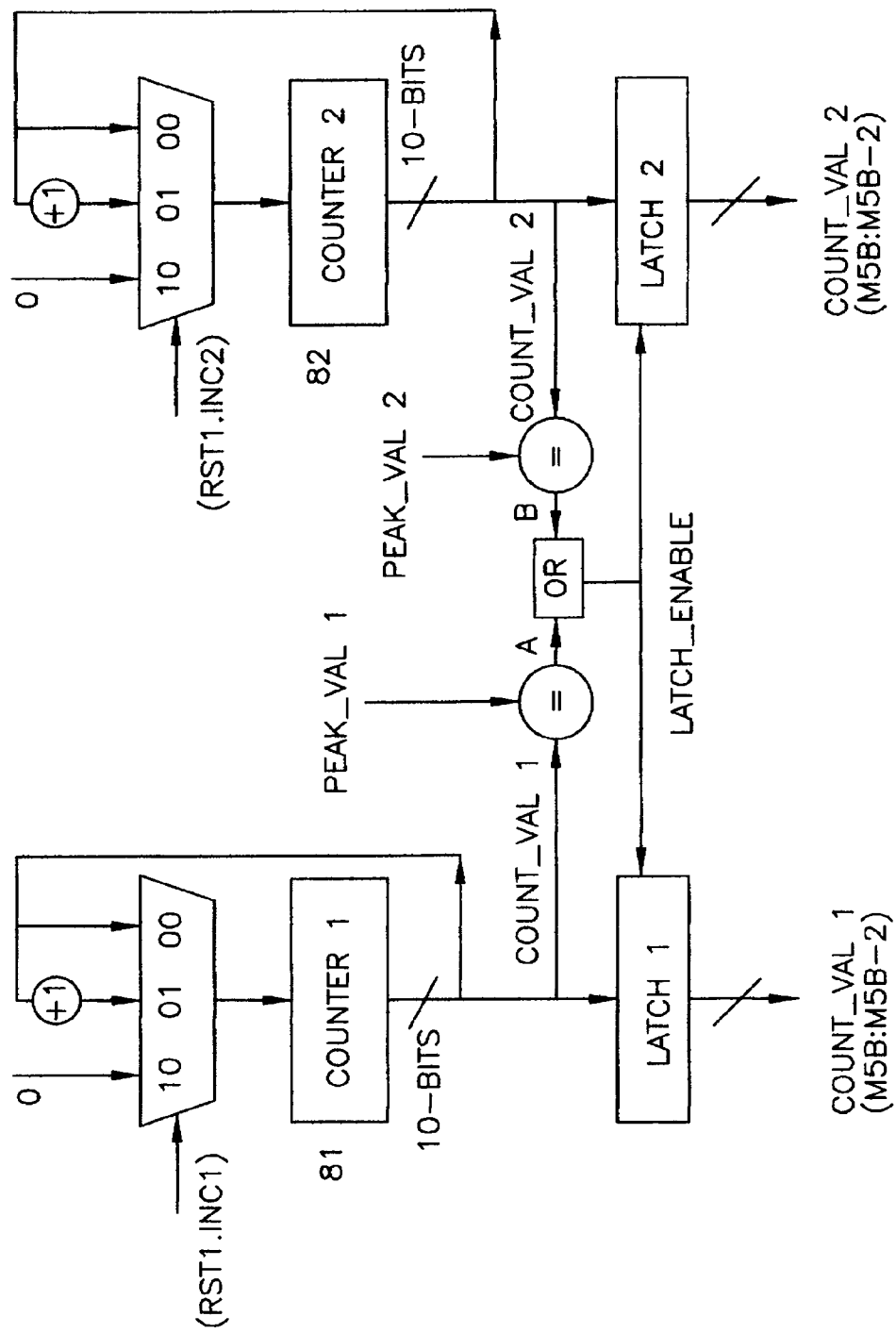
FIG. 3 illustrates a preferred circuit component embodiment for implementing the memory allocation technique of the invention.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1-3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers previously sold by the International Business Machines Corporation of Armonk, N.Y., and now sold by Lenovo (US) Inc. of Morrisville, N.C.; however, as will become apparent from the following description, the present invention is applicable to any data processing system. Notebook computers, as may be generally referred to or understood herein, may also alternatively be referred to as "notebooks", "laptops", "laptop computers" or "mobile computers".

As shown in FIG. 1, computer system 100 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to a local area network (LAN), and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard and mouse. In addition, I/O controller 70 supports external communication by computer system 100 via serial and parallel ports, including communication over a wide area network (WAN) such as the Internet. A disk controller 72 is in communication with a disk drive 200 for accessing external memory. Of course, it should be appreciated that the system 100 may be built with different chip sets and a different bus structure, as well as with any other suitable substitute components, while providing comparable or analogous functions to those discussed above.

A computer communications network switch 1 with one "ingress port" 11 (for conducting data transmissions with network device(s) not connected to the switch) and four "egress ports" 12 (for transmitting data with peripheral device(s) 21 connected to the switch) is shown in FIG. 2. The invention provides a way to dynamically re-allocate switch buffer memory (i.e., "load buffer" 31 and "store buffer" 32 assigned to each "egress port" 12) between "outbound" and "inbound" data transactions by (for example) adding two "10-bit" counters 81 & 82 per port to count the number of "outbound" and "inbound" data transmissions respectively occurring at that port over a defined period of time. Both counters are reset (each time a new peripheral device 21 is connected to the switch at that port 12) and the "outbound" and "inbound" data transactions are again (re)counted until the count for one transaction type reaches a peak value; whereupon use of the attached peripheral device 21 is evaluated to determine whether it is a "load intensive" device or a "store intensive" device (or neither type at that time) based on the ratio of the values of the two counters 81 & 82 at the time when one of them reaches its peak. The counter values used for determining the memory allocations can be made programmable by incorporating them into the software used to operate the switch (such as that disclosed for example in U.S. Pat. Nos. 6,690,951 & 6,456,590 & 5,588,138 which are incorporated by reference as if fully set forth herein). One example of possible counter values (and associated memory allocations) is shown in TABLE 1:

TABLE 1

| example re-allocation of switch buffer memory | |
|---|---|
| Ratio of Counters | Memory Allocation |
| 1024:512 (to 1024) | 8 KB:8 KB |
| 1024:256 (to 511) | 10 KB:6 KB |
| 1024:128 (to 255) | 12 KB:4 KB |
| 1024:0 (to 127) | 14 KB:2 KB |

A preferred circuit component embodiment for implementing the memory allocation technique of the invention is illustrated in FIG. 3:

| | |
|---|---|
| Reset (Rst1/2): | Asserted when a new peripheral device is connected or when Latch_Enable is asserted |
| Increment Counter 1 (Inc1): | Asserted when a data word (64 B) is written to Load Buffer |
| Increment Counter 2 (Inc2): | Asserted when a data word (64 B) is written to Store Buffer |
| Peak Value (Peak_Val 1/2): | The maximum value for the counters (default = ALL ONES) |
| Counter 1: | 10-bit counter to keep track of the number of times Load Buffer is used |
| Counter 2: | 10-bit counter to keep track of the number of times Store Buffer is used |
| A: | Counter1 reaches peak value |
| B: | Counter2 reaches peak value |
| Latch_Enable: | Asserted to capture and log the three (3) most significant bits of each counter |
| Latch 1/2: | Asserted to capture and retain the three most significant bits of each counter at the point in time when one of them reaches peak value |

When a new peripheral device is connected to the switch then Rst1 and Rst2 are asserted and the counters are reset to zero. Thereafter Inc1 is signaled and Counter 1 is incremented by one (1) for each instance of a data transaction using the Load Buffer. Similarly Inc2 is signaled and Counter 2 is incremented by one (1) for each instance of a data transaction using the Store Buffer. In other cases (no reset and no data flow) a counter retains its value. This process continues until one of the counters reaches a peak value (i.e ALL ONES) causing the value of A or B to become a '1' and asserting Latch_Enable to permit the latches to capture (and retain) the three most significant bits of both counters so as to allow the ratios of the values of Latch 1 and Latch 2 determine the ratio of the memory allocation for the Load/Store Buffer(s). The latch values are not affected (i.e. remain constant) until one of the counters reaches peak value again at which point the new latch values are used to redefine the switch memory buffer allocation(s).

TABLE 2 example values for latch ratio and switch memory buffer allocation

| Latch 1 (x = don't care) | Latch 2 (x = don't care) | Load:Store (Buffer ratios) |
|---|---|---|
| 111 | 000 (<128) | 14 KB:2 KB |
| 111 | 001 (128 to 256) | 12 KB:4 KB |
| 111 | 01x (256 to 512) | 10 KB:6 KB |
| 111 | 1xx (>512) | 8 KB:8 KB |
| 000 (<128) | 111 | 2 KB:14 KB |
| 001 (128 to 256) | 111 | 4 KB:12 KB |
| 01x (256 to 512) | 111 | 6 KB:10 KB |
| 1xx (>512) | 111 | 8 KB:8 KB |

Every time that one of the counters hits its peak value then the switch buffer memory is re-allocated and the counters are reset so that the process can be repeated to ensure that a wrong determination (made by the counting algorithm) will be rectified in the next reallocation cycle. It is expected that in most instances only one of the counters will reach a peak value in order to allow a comparison with the value of the other ("slow counter") to be used at that time in determining an optimal memory allocation. However, if the attached peripheral device is used as a "load-intensive" device in one iteration and as a "store-intensive" device in another iteration (i.e. for a given device each counter reaches a peak value before the other one at different times) then it is implied that the peripheral device is of a "generic nature" (i.e. having an equal probability of conducting "load" and/or "store" operations at different times) and that the (misleading) data movement patterns are thus "application specific". In that case the counters are turned off and the memory is equally shared (as in the initial instance). For "load" or "store" intensive devices considered in this invention it is possible that the ratio of the counters can be (111:000) or vice versa.

The preferred embodiment of the invention illustrated above follows an example where a switch having four ports uses eight thousand binary bytes (8 KB) of allocated memory per ("inbound and/or "outbound") transmission direction (or 16 KB per port), providing a total of (4 ports×2 directions per port×8 KB per direction=64 KB) of allocated buffer memory. In the above example, the total 16 KB of buffer memory is normally allocated evenly (i.e. 8 KB per transmission direction for each switch port) but if the peripheral device connected to a port is "load intensive" then the switch buffer memory (assigned to the port) can be re-allocated using the invention to as much as 14 KB for "inbound" transmissions and as little as 2 KB for "outbound" transmissions. Similarly in case of a "store intensive" peripheral device then the re-allocation can be as much as 14 KB of buffer memory for "outbound" transmissions and as little as 2 KB of memory for "inbound" transmissions. However other types of memory allocations can also be made using the concepts provided in this disclosure.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. The software in these embodiments may be deployed in these embodiments using any suitable software fulfillment technique, including without limitation: (i) distributing non-rewritable storage media (e.g., CD-ROM disks readable by a CD-ROM drive or DVD-ROM disks readable by a DVD-ROM drive); (ii) storing a program on a network accessible storage media (e.g., a public website, a public FTP site), receiving a request for the program, and transmitting the program to the requester over the network. Aspects of these embodiments may further include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of buffer memory management in use of a computer communications network data transmission switch, the method comprising the steps of:
   a. monitoring data movement pattern(s) in a peripheral device attached to a switch;
   b. determining whether the peripheral device is used in at least one of a load intensive mode or in a store intensive mode or in neither mode over a defined time period; and
   c. adjusting the size of at least one switch memory buffer assigned to the peripheral device;
   wherein the assigned switch buffer memory is dynamically reallocated when the peripheral device is operating in load intensive mode or in store intensive mode; and
   wherein switch buffer memory is allocated by use of two counters assigned to each switch transmission port attached to the peripheral device such that:
      (i). both counters are reset when a peripheral device is connected to the switch at the port;
      (ii). a counter incrementally records the number of outbound or inbound data transactions occurring via the buffer memory assigned to the port until the count for either one of the transaction types reaches a peak value; and
      (iii). the buffer memory is (re)allocated and the counters are reset when one counter reaches the peak value; and
   wherein use of the attached peripheral device in a load intensive mode or in a store intensive mode or in neither mode is determined by the ratio of counter values at the time when one counter reaches the peak value.

2. The method of claim 1 wherein two 10-bit counters are used per switch port to each retain the three most significant bits counted when the peak value is reached.

3. The method of claim 1 wherein no reset occurs and a counter retains its value when no data flow occurs.

4. The method of claim 1 wherein the switch is selected from a group comprised of "Bridge" or "Hub" or "Router" computer communications network switches.

5. A computer system comprised of a computer processor configured for executing program instructions stored in computer memory and arranged for buffer memory management in use of a computer communications network data transmission switch, the system comprising:
   a. an arrangement for monitoring the data movement pattern(s) in a peripheral device attached to a switch;
   b. an arrangement for determining whether the peripheral device is used in a load intensive mode or in a store intensive mode or in neither mode over a defined time period; and
   c. an arrangement for adjusting the size of at least one switch memory buffer assigned to the peripheral device;
   wherein the assigned switch buffer memory is dynamically reallocated when the peripheral device is operating in load intensive mode or in store intensive mode; and
   wherein switch buffer memory is allocated by use of two counters assigned to each switch transmission port attached to the peripheral device such that:
      (i). a both counters are reset when a peripheral device is connected to the switch at the port;
      (ii). a counter incrementally records the number of outbound or inbound data transactions occurring via the buffer memory assigned to the port until the count for either one of the transaction types reaches a peak value; and
      (iii). the buffer memory is (re)allocated and the counters are reset when one counter reaches the peak value; and
   wherein use of the attached peripheral device in a load intensive mode or in a store intensive mode or in neither mode is determined by the ratio of counter values at the time when one counter reaches the peak value.

6. The computer system of claim 5 wherein two 10-bit counters are used per switch port to each retain the three most significant bits counted when the peak value is reached.

7. The computer system of claim 5 wherein no reset occurs and a counter retains its value when no data flow occurs.

8. The computer system of claim 5 wherein the switch is selected from a group consisting of "Bridge" or "Hub" or "Router" computer communications network switches.

9. A computer program storage device readable by a computer processor machine, tangibly embodying a program of instructions executable by the machine to perform a method of buffer memory management in use of a computer communications network data transmission switch, the method comprising the steps of:
   a. monitoring the data movement pattern(s) in a peripheral device attached to a switch;
   b. determining whether the peripheral device is used in a load intensive mode or in a store intensive mode or in neither mode over a defined time period; and
   c. adjusting the size of at least one switch memory buffer assigned to the peripheral device;
   wherein the assigned switch buffer memory is dynamically reallocated when the peripheral device is operating in load intensive mode or in store intensive mode; and
   wherein switch buffer memory is allocated by use of two counters assigned to each switch transmission port attached to the peripheral device such that:
      (i). both counters are reset when a peripheral device is connected to the switch at the port;
      (ii). a counter incrementally records the number of outbound or inbound data transactions occurring via the buffer memory assigned to the port until the count for either one of the transaction types reaches a peak value; and
      (iii). the buffer memory is (re)allocated and the counters are reset when one counter reaches the peak value; and
   wherein use of the attached peripheral device in a load intensive mode or in a store intensive mode or in neither mode is determined by the ratio of counter values at the time when one counter reaches the peak value.

10. The computer program storage device of claim 9 wherein two 10-bit counters are used per switch port to each retain the three most significant bits counted when the peak value is reached.

11. The computer program storage device of claim 9 wherein no reset occurs and a counter retains its value when no data flow occurs.

12. The computer program storage device of claim 9 wherein the switch is selected from a group consisting of "Bridge" or "Hub" or "Router" computer communications network switches.

13. A method for deploying computing infrastructure, comprising integrating computer readable program code into a computing system, wherein the code in combination with the computing system is adapted to perform the method of claim 1.

14. The method of claim 13, further comprising:
storing the computer readable program code in an internet accessible storage media; and
receiving a request for the computer readable program code from a computing device;
in response to the request, transmitting the computer readable program code to the computing device.

* * * * *